(12) United States Patent
Al-Omari et al.

(10) Patent No.: US 8,774,451 B2
(45) Date of Patent: Jul. 8, 2014

(54) METHOD AND APPARATUS FOR EMBEDDING A WATERMARK IMAGE IN A HOST IMAGE

(75) Inventors: Hussein Khalid Al-Omari, Amman (JO); Mohammad Ibrahim Alkanhal, Riyadh (SA); Abdulaziz Obaid Alobaid, Riyadh (SA); Hussam Abdulrahman Alfaleh, Riyadh (SA)

(73) Assignee: King Abdul Aziz City for Science and Technology (KACST), Riyadh (SA)

( * ) Notice: Subject to any disclaimer, the term of this patent is extended or adjusted under 35 U.S.C. 154(b) by 539 days.

(21) Appl. No.: 13/096,930

(22) Filed: Apr. 28, 2011

(65) Prior Publication Data

US 2012/0275641 A1    Nov. 1, 2012

(51) Int. Cl.
*G06K 9/00* (2006.01)
*G06T 9/00* (2006.01)
*G06T 1/00* (2006.01)
*G06K 9/36* (2006.01)

(52) U.S. Cl.
CPC ... *G06K 9/00* (2013.01); *G06T 9/00* (2013.01); *G06T 9/005* (2013.01); *G06T 2211/00* (2013.01); *G06T 2201/0052* (2013.01); *G06T 1/0071* (2013.01); *G06T 2201/0061* (2013.01)
USPC ........................................ 382/100; 382/250

(58) Field of Classification Search
CPC .............. G06T 2201/0052; G06T 2201/0061; G06T 1/0071; G06T 2211/00
USPC ......... 382/100, 113, 135, 155, 162, 173, 181, 382/199, 219, 224, 232, 240, 254, 274, 276, 382/291, 305, 312; 713/168, 173, 176; 726/26; 380/28, 54, 55, 46, 201, 243; 341/50–51, 65, 67, 106–107; 375/240, 375/240.19, 240.2, 240.26; 358/3.28; 348/143, 150, 231.99, 509, 589; 709/231; 725/136
See application file for complete search history.

(56) References Cited

U.S. PATENT DOCUMENTS

| | | | | |
|---|---|---|---|---|
| 6,332,030 | B1 * | 12/2001 | Manjunath et al. | 382/100 |
| 8,127,137 | B2 * | 2/2012 | Levy | 713/176 |
| 8,243,984 | B1 * | 8/2012 | Brown et al. | 382/100 |
| 2003/0026453 | A1 * | 2/2003 | Sharma et al. | 382/100 |
| 2003/0033530 | A1 * | 2/2003 | Sharma et al. | 713/176 |
| 2005/0271246 | A1 * | 12/2005 | Sharma et al. | 382/100 |
| 2008/0130883 | A1 * | 6/2008 | Agaian et al. | 380/54 |
| 2009/0060264 | A1 * | 3/2009 | Sharma et al. | 382/100 |
| 2011/0081041 | A1 * | 4/2011 | Sharma et al. | 382/100 |
| 2011/0176706 | A1 * | 7/2011 | Levy | 382/100 |
| 2012/0076295 | A1 * | 3/2012 | Brundage et al. | 380/46 |

* cited by examiner

*Primary Examiner* — Hadi Akhavannik
*Assistant Examiner* — Mehdi Rashidian
(74) *Attorney, Agent, or Firm* — Timberline Patent Law Group PLLC

(57) ABSTRACT

The invention provides method of embedding a watermark image in a host image. The method includes generating a matrix code symbol, wherein the matrix code symbol includes information associated with the watermark image and the host image. The method further includes embedding the watermark image and the matrix code symbol in the host image at non-overlapping positions in the host image.

10 Claims, 8 Drawing Sheets

FIG. 8

METHOD AND APPARATUS FOR EMBEDDING A WATERMARK IMAGE IN A HOST IMAGE

FIELD OF THE INVENTION

The invention generally relates to embedding watermark images, and more specifically to a method of embedding a watermark image and a matrix code symbol in a host image.

BACKGROUND OF THE INVENTION

Watermarking is a process of embedding data into an image or an audio or video signal for preventing illegal copying as well as securing the copyright and ownership of data owner. The data that is embedded is called a watermark. Typically, the watermark corresponds to a code, a pattern, a logo, an image, or some form of identification information associated with the data owner. In general, the watermark is embedded into original data by adding a watermark signal to the original data. An algorithm accepts the original data and the watermark signal to be embedded and produces a watermarked data. Once embedded, the watermark remains within the original data when it is stored or transmitted. Subsequently, the watermark may be extracted at any later point in time to verify the owner of the original data.

However, due to changes or attacks to the original data, such as a host image, the watermark may suffer damages, thereby causing loss in information associated with the watermark. For example, the watermark embedded in the host image may be corrupted intentionally, to bypass or destroy the ownership information, or unintentionally through various transformations that occur while handling the host image. As a result, the watermark that gets extracted may not be completely identifiable or may not include all the necessary information required for tracing the host image and verifying the ownership information associated with the host image.

Therefore, there is a need for a method and apparatus for reliably embedding a watermark image in a host image that increases robustness of the watermark image against various kinds of attacks and damages.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

FIG. 8 is a block diagram illustrating embedding and extracting of a watermark image in a host image in accordance with an embodiment of the invention.

Figure 1:
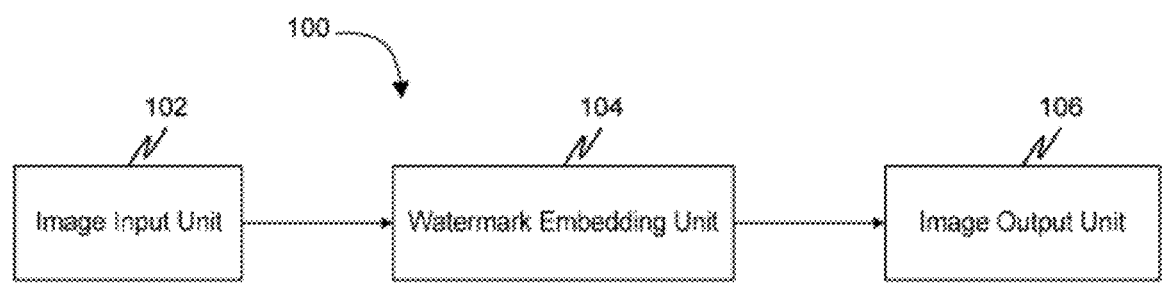
FIG. 1 illustrates an exemplary environment in which various embodiments of the invention may function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to a method of embedding a watermark image in a host image. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Various embodiments of the invention provide a method of embedding a watermark image in a host image. The method includes generating a matrix code symbol. The matrix code symbol includes information associated with the watermark image and the host image. The method further includes embedding the watermark image and the matrix code symbol in the host image. The watermark image and the matrix code symbol are embedded at non-overlapping positions in the host image.

FIG. 1 illustrates an exemplary environment 100 in which various embodiments of the invention may function. Environment 100 includes an image input unit 102, a watermark embedding unit 104, and an image output unit 106. Image input unit 102 is configured to receive a host image that needs to be embedded with an image. An example of the host image is a digital image. Further, the watermark image that is embedded in the host image corresponds to a binary watermark image. However, it will be evident to a person skilled in the art that any other type of watermark image may also be embedded in the host image. After receiving the host image, image input unit 102 transfers the host image to watermark embedding unit 104. Watermark embedding unit 104 processes the host image before embedding the watermark image. For example, watermark embedding unit may divide the host image into multiple regions. Further, the host image may be subjected to one or more transformations by watermark embedding unit 104. For instance, watermark embedding unit 104 may perform orthogonal transformation of the host image by computing the Discrete Cosine Transformation (DCT) of the host image.

After performing the transformation of the host image, watermark embedding unit 104 embeds the watermark image in the host image. In an embodiment, the watermark image that is embedded in the host image may be generated by the watermark embedding unit 104. Alternatively, in another embodiment, the watermark image may be generated by an external unit (not shown in the FIG. 1). Thereafter, the host image that is embedded with the watermark image is sent to image output unit 106. Finally, image output unit 106 outputs the host image with the watermark image embedded in it. The resulting host image containing the watermark image that is output from image output unit 106 resembles the original host image.

Figure 2:
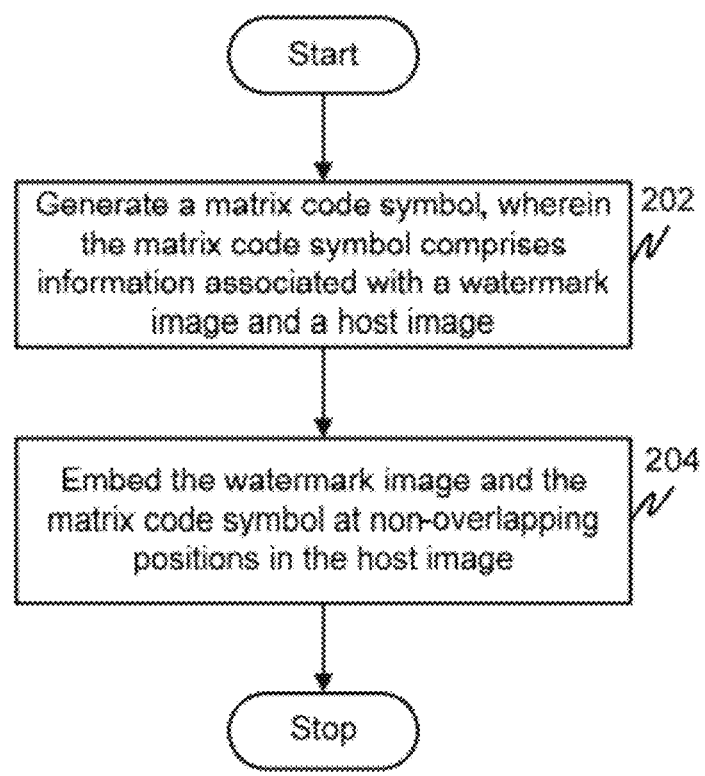
FIG. 2 illustrates a flowchart of a method for embedding a watermark image in a host image in accordance with an embodiment of the invention.

FIG. 2 is a flowchart of a method of embedding a watermark image in a host image in accordance with an embodiment of the invention. The host image, for example may be a digital image. However, it will be evident to a person skilled in the art that the method may also be applied to other types of media such as electronic documents, software, and surface texture of objects. The watermark image includes information associated with the host image. The information may correspond to one or more of a logo, a company name, ownership information, and other kinds of Intellectual Property rights associated with the owner of the host image.

At step 202, a matrix code symbol is generated. Examples of the matrix code symbol may include, but is not limited to a one dimensional data matrix, a two dimensional data matrix, and a three dimensional data matrix. The matrix code symbol includes information associated with the watermark image and the host image. Further, the size of the matrix code symbol is selected based on the amount of information that is stored in the matrix code symbol. Thus, the size of the matrix code symbol is optimized to hold all the information associated with the watermark image and the host image as well to ensure that the matrix code symbol does not occupy a lot of space in the host image. This is further explained in conjunction with FIG. 3.

After generating the matrix code symbol, at step 204, the watermark image and the matrix code symbol are embedded in the host image. The watermark image and the matrix code symbol are embedded in the host image at multiple non-overlapping positions. The watermark image and the matrix code symbol are embedded at multiple positions in the host image in order to avoid any damage that may be sustained as a result of cropping or wearing. For example, the watermark image and the matrix code symbol may be embedded in the host image 3 by 3 (9 times), 5 by 5 (25 times), and so on. Further, the watermark image and the matrix code symbol are embedded at non-overlapping positions to ensure that there is no overlap between the watermark image and the matrix code symbol. The watermark image and the matrix code symbol are embedded at non-overlapping positions by utilizing the same random sequencing algorithm for embedding. This is further explained in conjunction with FIG. 4.

Figure 3:
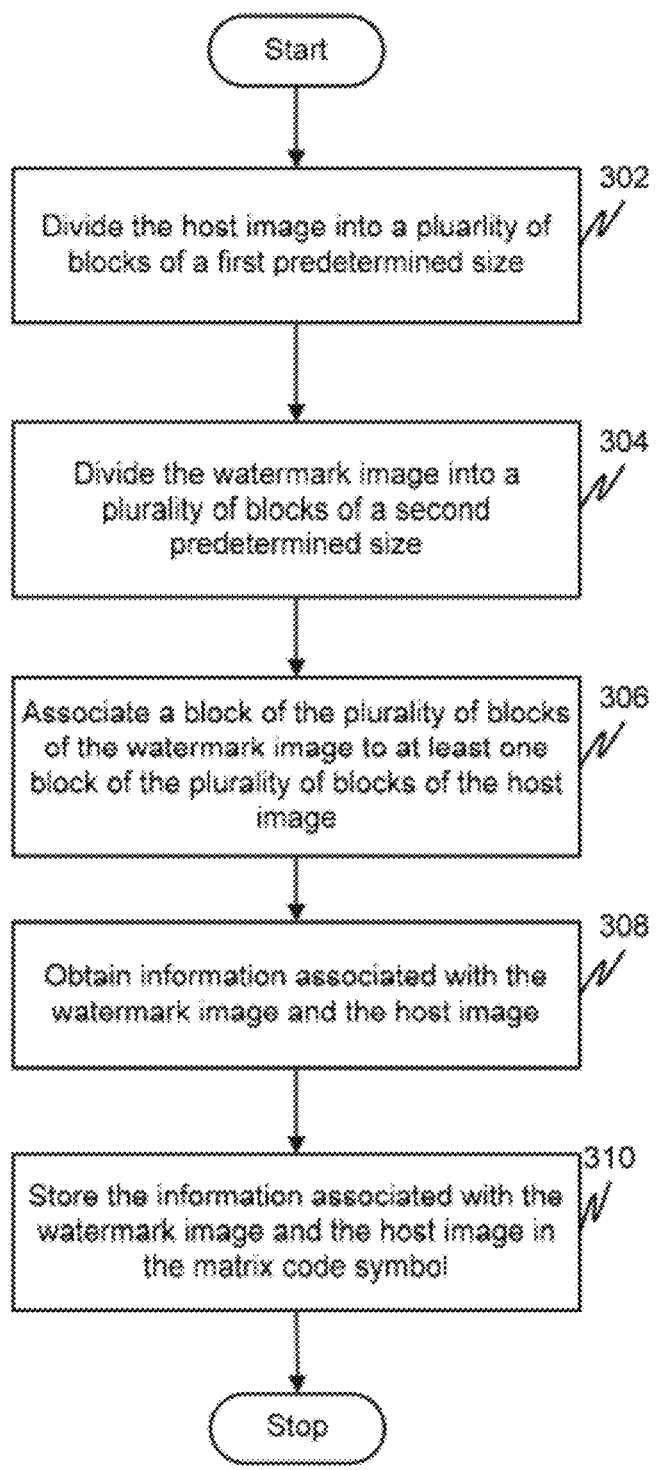
FIG. 3 illustrates a flowchart of a method for generating a matrix code symbol in accordance with an embodiment of the invention.

FIG. 3 illustrates a flowchart of a method for generating the matrix code symbol in accordance with an embodiment of the invention. The information stored in the matrix code symbol corresponds to metadata which is associated with the watermark image and the host image. Initially, the host image and the watermark image are analyzed and one or more parameters associated with the host image and the watermark image are determined. For example, a size of the host image, a size of the watermark image, and a type of the watermark image may be determined. Thereafter, at step 302, the host image is divided into a plurality of blocks of a first predetermined size. In an exemplary embodiment, the first predetermined size may correspond to 8×8 pixels. For example, if the length of the host image is 20 pixels and the width is 18 pixels, then the host image may be divided into 4 blocks, wherein size of each block is 8×8 pixels. Subsequently, remaining columns and rows of the host image may be ignored for any additional processing. Thus, after dividing the 20×18 host image into 4 blocks of 8×8 pixels, the remaining 4 columns and 2 rows may be ignored from any subsequent processing of the host image. This is further explained in conjunction with FIG. 6.

Thereafter, at step 304, the watermark image is divided into a plurality of blocks of a second predetermined size. In an embodiment, the second predetermined size may correspond to 2×2 pixels. For example, if the watermark image is 5×5 in size, then the watermark image is divided into 4 blocks, wherein each block is 2×2 pixels in size. Subsequently, the last column and the last row of the watermark image may be ignored from any additional processing in the same manner as the remaining columns and rows of the host image are ignored. This is further explained in conjunction with FIG. 7. Further, the plurality of blocks of the host image must be greater in number than the plurality of blocks of the watermark image. If the plurality of blocks of the host image are not greater in number than the plurality of blocks of the watermark image, then it may not be possible to embed the watermark image in the host image in a robust and effective manner.

After dividing the watermark image into the plurality of blocks, at step 306, a block of the plurality of blocks of the watermark image is associated to one or more blocks of the plurality of blocks of the host image. In an embodiment, the block of the plurality of blocks of the watermark image may be associated with a block of the plurality of blocks of the host image. In another embodiment, the block of the plurality of blocks of the watermark image may be associated with multiple blocks of the plurality of blocks of the host image.

In response to associating the plurality of blocks of the watermark image to the plurality of the blocks of the host image, at step 308, information associated with the watermark image and the host image is obtained. The information may correspond to knowledge about one or more of the plurality of blocks of the host image, the plurality of blocks of the watermark image, association between the plurality of blocks of the watermark image and the plurality of blocks of the host image, a size of the watermark image, a size of the host image, and an embedding scheme. The embedding scheme includes information associated with an encoding process that is required for embedding and extracting the watermark image, and the matrix code symbol.

Thereafter, the information associated with the watermark image and the host image is utilized for generating the matrix code symbol. In order to generate the matrix code symbol, at step 310, the information associated with the watermark image and the host image is stored in the matrix code symbol using the encoding process included in the embedding scheme. Further, during the process of generating the matrix code symbol, the size of the matrix code symbol is optimized based on the amount of information that is associated with the watermark image and the host image. Thus, the size of the matrix code symbol may be selected to be small enough so as not to consume a large amount of space in the host image and large enough to hold the complete information associated with the watermark image and the host image.

Figure 4:
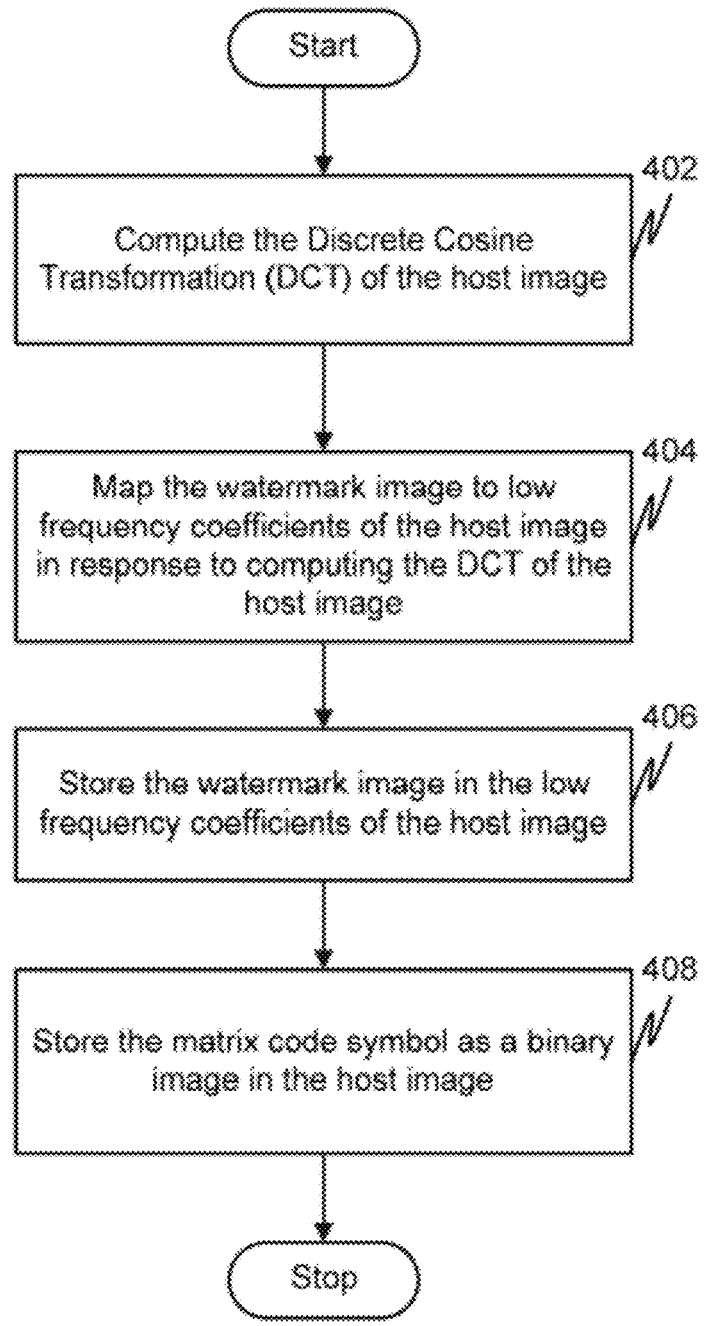
FIG. 4 illustrates a flowchart of a method for embedding a watermark image and a matrix code symbol in a host image in accordance with an embodiment of the invention.

FIG. 4 illustrates a flowchart of a method for embedding the watermark image and the matrix code symbol in the host image in accordance with an embodiment of the invention. After generating the matrix code symbol using the information associated with the watermark image and the host image, at step 402, the Discrete Cosine Transformation (DCT) of the host image is computed. As a result of computing the DCT of the host image, the host image is represented in terms of a sum of cosine functions oscillating at different frequencies. Thereafter, at step 404, the plurality of blocks of the watermark image is mapped to low frequency coefficients of the host image. The plurality of blocks of the watermark image may be mapped to low frequency coefficients of the host image using a pseudo random number generator with unique hits. As the DCT is a form of frequency transformation, the spatial relationships of pixels in the host image are de-correlated and the majority of the energy concentrates on the low frequency components.

Thereafter, at step 406, the plurality of blocks of the watermark image is stored in the low frequency coefficients of the host image. In an embodiment, the low frequency coefficients correspond to second least significant bit associated with a block of the host image. For example, a block of the watermark image may be stored in second least significant bit of a block of the host image. After storing the plurality of blocks of the watermark image in the low frequency coefficients of the host image, at step 408, the matrix code symbol is stored in the host image. The matrix code symbol is stored in the host image as a binary image. Thus, the matrix code symbol represents an additional watermark image that is stored in the host image. In an embodiment, the matrix code symbol may be stored in the host image prior to storing of the watermark image in the host image. This is further explained in conjunction with FIG. 8.

In order to increase the robustness of the watermark image, the watermark image and the matrix code symbol may be stored multiple times in the host image at non-overlapping positions. One or more error correction codes may also be embedded in the matrix code symbol making it even more robust to attacks and damages. For instance, information stored in the matrix code symbol may be successfully extracted even when the matrix code symbol suffers 60% damage. Consequently, even if the host image suffers attacks or damages, intentionally or unintentionally, it will still be possible to successfully extract and identify the watermark image embedded in the host image by extracting the matrix code symbol that includes the information about the host image and the watermark image.

Thus, in order to extract the watermark image embedded in the host image, initially, the matrix code symbol is extracted from the host image. After extracting the matrix code symbol, the information contained in the matrix code symbol is decoded to obtain information associated with the host image and the watermark image. Thereafter, an Inverse Discrete Cosine Transformation (IDCT) of the host image is performed to obtain the mapping between the plurality of blocks of the watermark image and the plurality of blocks of the host image. However, performing IDCT on the host image results in generation of floating point pixel values of the plurality of blocks of the host image. As a result, some information associated with the watermark image embedded in the host image may become unrecoverable as data associated with the watermark image may be lost by rounding the floating point pixel values. In order to avoid such problems, in an embodiment, rather than rounding the floating point pixel values to integer numbers, the floor value of the floating point pixel values is taken. In another embodiment, the resulting numbers are rounded to obtain integer numbers. This is further explained in conjunction with FIG. 8.

Figure 5:
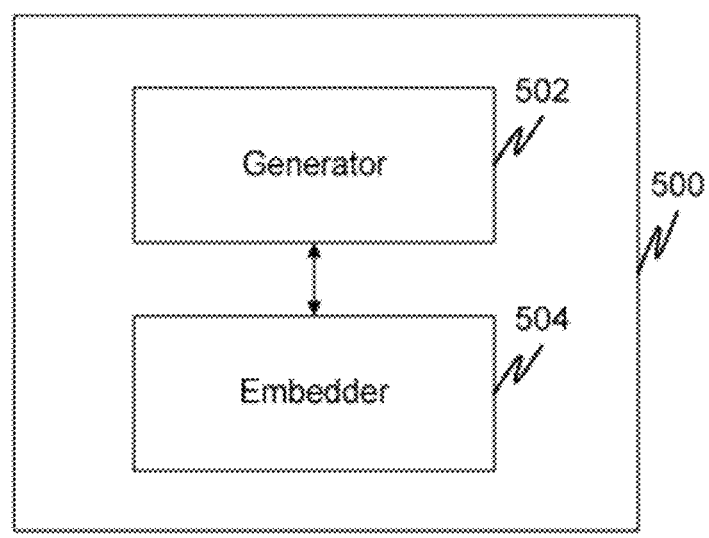
FIG. 5 illustrates a block diagram of an apparatus for embedding a watermark image in a host image in accordance with an embodiment of the invention.

FIG. 5 illustrates a block diagram of an apparatus 500 for embedding the watermark image in the host image in accordance with an embodiment of the invention. Apparatus 500 includes a generator 502 that is operatively coupled to an embedder 504. Apparatus 500 is configured to receive a host image. Further, Apparatus 500 is also configured to receive a watermark image. Alternatively, in an embodiment, Apparatus 500 may be configured to generate a watermark image.

After receiving the host image and the watermark image, generator 502 generates a matrix code symbol. The matrix code symbol includes information associated with the watermark image and the host image. In order to generate the matrix code symbol, generator 502 divides the host image into a plurality of blocks of a first predetermined size. Prior to dividing the host image, generator 502 determines the size of the host image. Based on the size of the host image, generator 502 selects the first predetermined size to divide the host image into the plurality of blocks. Subsequently, the columns and rows remaining after dividing the host image into the plurality of blocks of first predetermined size are ignored and not considered for any subsequent processing. This is further explained in conjunction with FIG. 6.

After dividing the host image into the plurality of blocks, generator 502 divides the watermark image into a plurality of blocks of a second predetermined size. Prior to dividing the watermark image, generator 502 determines the size of the watermark image. Based on the size of the watermark image, generator 502 selects the second predetermined size to divide the watermark image. Subsequently, the columns and rows remaining after dividing the watermark image into the plurality of blocks of second predetermined size are ignored and not considered for any subsequent processing. This is further explained in conjunction with FIG. 7.

Thereafter, generator 502 associates a block of the plurality of blocks of the watermark image to one or more blocks of the plurality of blocks of the host image. Generator 502 may associate the block of the watermark image to a single block of the host image or to multiple blocks of the host image. This has already been explained with respect to FIG. 3. After associating, generator 502 obtains information associated with the watermark image and the host image. The information may correspond to knowledge about one or more of the plurality of blocks of the host image, the plurality of blocks of the watermark image, association between the plurality of blocks of the watermark image and the plurality of blocks of the host image, a size of the watermark image, a size of the host image, and an embedding scheme.

In order to obtain the information, generator 502 may extract the information from the watermark image and the host image. In an embodiment, generator 502 may receive information associated with the watermark image and the host image from some external unit. After obtaining the information, generator 502 generates the matrix code symbol. Generator 502 stores the information associated with the watermark image and the host image in the matrix code symbol. Further, generator 502 may optimize the size of the matrix code symbol based on the obtained information. This has already been explained with respect to FIG. 3.

After generating the matrix code symbol, generator 502 sends the matrix code symbol to embedder 504. Embedder 504 embeds the watermark image and the matrix code symbol in the host image. In order to embed the watermark image in the host image, embedder 502 computes the DCT of the host image. Thereafter, embedder 504 maps the plurality of blocks of the watermark image to low frequency coefficients of the host image. For example, embedder 504 maps the plurality of blocks of the watermark image to a second least significant bit of a block of the host image.

After mapping the plurality of blocks of the watermark image to the low frequency coefficients of the plurality of blocks of the host image, embedder 504 stores the watermark image in the low frequency coefficients. Subsequent to storing of the watermark image, embedder 504 stores the matrix code symbol in the host image as a binary image. Thus, the matrix code symbol is stored as an additional watermark in the host image. Additionally, the matrix code symbol is stored at non-overlapping positions with respect to the watermark image in the host image. This is further explained in conjunction with FIG. 8.

Subsequent to embedding the watermark image and the matrix code symbol, the watermark image may be recovered at a later stage for verifying and authenticating the owner of the host image. In order to extract the watermark image embedded in the host image, generator 502 initially extracts the matrix code symbol from the host image. After extracting the matrix code symbol, generator 502 decodes the information contained in the matrix code symbol to obtain information associated with the host image and the watermark image. Thereafter, generator 502 performs an Inverse Discrete Cosine Transformation (IDCT) of the host image to obtain the mapping between the plurality of blocks of the watermark image and the plurality of blocks of the host image. However, performing IDCT on the host image results in generation of floating point pixel values of the plurality of blocks of the host image. This has already been explained with respect to FIG. 4. In order to avoid such problems, in an embodiment, generator 502 takes the floor value of the floating point pixel values rather than rounding the floating point pixel values to integer numbers. In another embodiment, generator 502 rounds the resulting numbers to obtain integer numbers. This is further explained in conjunction with FIG. 8.

Figure 6:
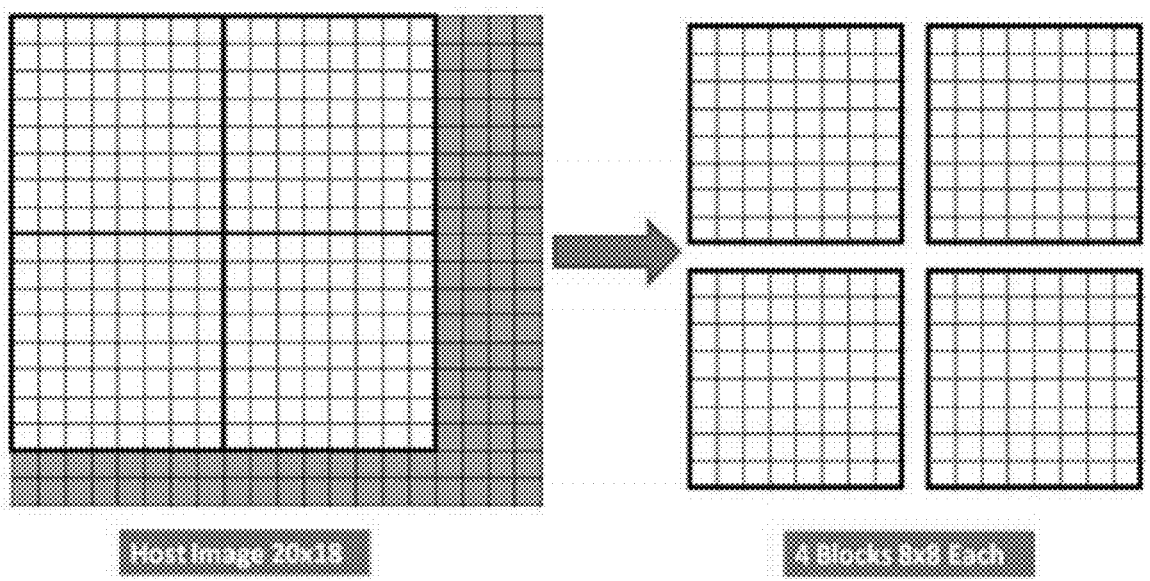
FIG. 6 is a block diagram illustrating a process of dividing a host image into a plurality of blocks of a first predetermined size in accordance with an embodiment of the invention.

FIG. 6 is a block diagram illustrating the process of dividing the host image into a plurality of blocks of a first predetermined size in accordance with an embodiment of the invention. A host image of size 20×18 pixels is received and analyzed by generator 502. Based on the analysis, generator 502 divides the host image into 4 blocks, wherein size of each block is equal to 8×8 pixels. After dividing the host image into 4 blocks, 4 columns and 2 rows are remaining that cannot be divided any further into blocks of 8×8 pixels in size. Thus, the last 4 columns and last 2 rows of the host image are ignored by generator 502 from any subsequent processing. In an embodiment, generator 502 may crop the last 4 columns and last 2 rows from the host image.

Figure 7:
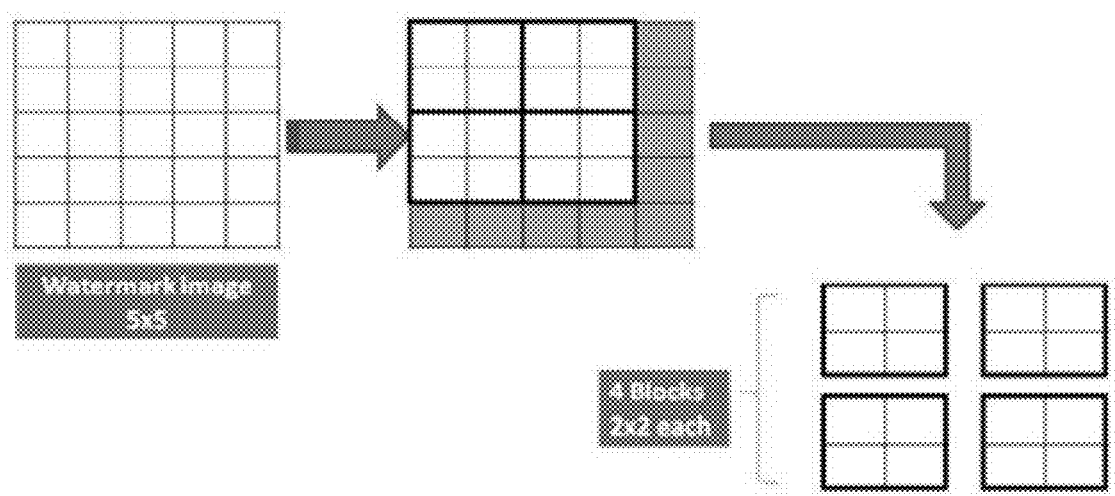
FIG. 7 is a block diagram illustrating a process of dividing a watermark image into a plurality of blocks of a second predetermined size in accordance with an embodiment of the invention.

FIG. 7 is a block diagram illustrating the process of dividing the watermark image into a plurality of blocks of a second predetermined size in accordance with an embodiment of the invention. A watermark image of size 5×5 pixels is received and analyzed by generator 502. Based on the analysis, generator 502 divides the watermark image into 4 blocks, wherein size of each block is equal to 2×2 pixels. After dividing the watermark image into 4 blocks, one column and one row are remaining that cannot be divided any further into blocks of 2×2 pixels in size. Thus, the last column and the last row of the watermark image are ignored by generator 502 from any subsequent processing. In an embodiment, generator 502 may crop the last column and the last row from the watermark image.

Figure 8:
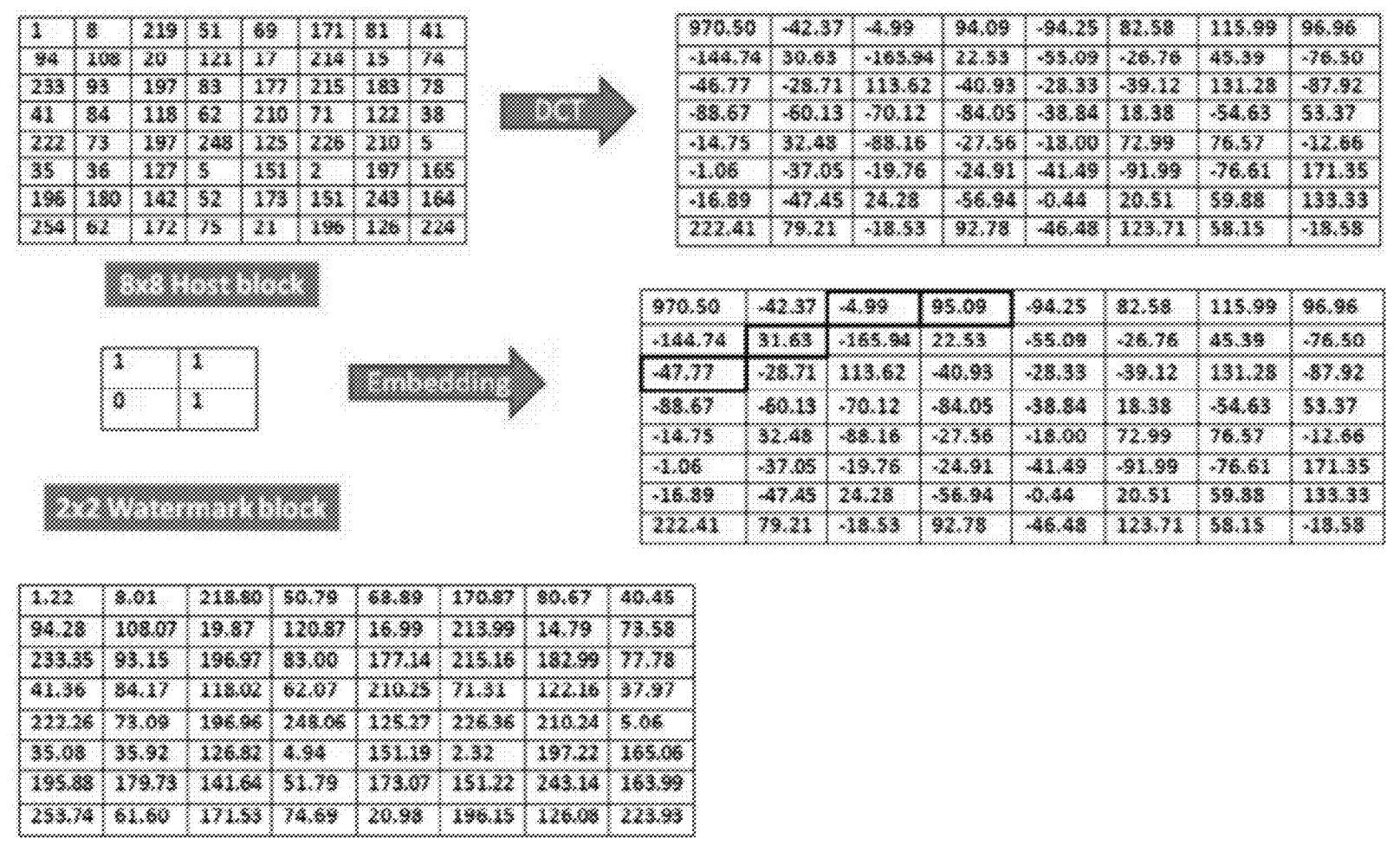

FIG. 8 is a block diagram illustrating embedding and extracting of a watermark image in a host image in accordance with an embodiment of the invention. To start the process, the host image and the watermark image are received. Thereafter, the host image and the watermark image are divided into a plurality of blocks of 8×8 pixels and 2×2 pixels respectively. This has already been explained with respect to FIG. 5. After dividing the host image, a DCT of the host image is computed. Thereafter, a block of size 2×2 pixels of the watermark image is mapped to one or more blocks of the plurality of blocks of the host image. After mapping, the watermark image block is stored in the second least significant bits of the zig-zag pixels of the DCT host image block. In order to extract the watermark image from the host image, an IDCT of the DCT host image is performed. Further, the floor value of the floating point pixel values is taken to obtain the original host image.

Various embodiments of the method described herein facilitate in embedding a watermark image in a host image. The method generates a matrix code symbol that includes information associated with the watermark image and the host image. The watermark image is stored in a plurality of blocks in the host image. Further, the watermark image is stored in the low frequency coefficients of the host image. This facilitates in making the watermark image more robust to attacks and damages. Also, the matrix code symbol is stored in the host image as a binary image in a plurality of blocks of the host image. As the matrix code symbol and the watermark image are stored at multiple places in the host image, it is possible to extract the watermark image from the host image even when the host image is subjected to damages and attacks. Moreover, as the matrix code symbol can sustain a damage of up to 60%, the information associated with the watermark image and the host image can be successfully extracted. Thus, the storage of the matrix code symbol and the watermark image at multiple places facilitates in a complete blind extraction of the watermark image when the host image is damaged.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all of the claims. The present invention is defined solely by the appended claims including any amendments made during the pendency of this application and all equivalents of those claims as issued.

What is claimed is:

1. A method for embedding a watermark image in a host image, the method comprising:
   generating a matrix code symbol, wherein the matrix code symbol comprises information associated with the watermark image and the host image;
   embedding the watermark image and the matrix code symbol in the host image, wherein the watermark image and the matrix code symbol are embedded at non-overlapping positions in the host image;
   wherein generating comprises dividing the host image into a plurality of blocks of a first predetermined size and dividing the watermark image into a plurality of blocks of a second predetermined size;
   wherein generating further comprises associating a block of the plurality of blocks of the watermark image to at least one block of the plurality of blocks of the host image;
   wherein generating further comprises obtaining information associated with the watermark image and the host image and storing the information associated with the watermark image and the host image in the matrix code symbol; and wherein the information corresponds to knowledge about at least one of the plurality of blocks of the host image, the plurality of blocks of the watermark image, an association between a block of the plurality of blocks of the watermark image and at least one block of the plurality of blocks of the host image, a size of the watermark image, a size of the host image, and an embedding scheme.

2. The method of claim 1, wherein the plurality of blocks of the host image are greater in number than the plurality of blocks of the watermark image.

3. The method of claim 1, wherein the watermark image comprises at least one of a company logo, a picture, and a digital image.

4. A method for embedding a watermark image in a host image, the method comprising:

generating a matrix code symbol, wherein the matrix code symbol comprises information associated with the watermark image and the host image;

embedding the watermark image and the matrix code symbol in the host image, wherein the watermark image and the matrix code symbol are embedded at non-overlapping positions in the host image wherein embedding comprises computing the Discrete Cosine Transformation (DCT) of the host image and mapping the watermark image to low frequency coefficients of the host image in response to computing the DCT of the host image, wherein a low frequency coefficient corresponds to a second least significant bit associated with a block of the host image.

5. The method of claim 4, wherein embedding further comprises:

storing the watermark image in the low frequency coefficients of the host image; and storing the matrix code symbol as a binary image in the host image.

6. An apparatus for embedding a watermark image in a host image, the apparatus comprising:

a generator for generating a matrix code symbol, wherein the matrix code symbol comprises information associated with the watermark image and the host image;

an embedder for embedding the watermark image and the matrix code symbol in the host image, wherein the embedder embeds the watermark image and the matrix code symbol at non-overlapping positions in the host image;

wherein the embedder is further configured to compute the Discrete Cosine Transformation (DCT) of the host image, and map the watermark image to low frequency coefficients of the host image in response to computing the DCT of the host image, wherein a low frequency coefficient corresponds to a second least significant bit associated with a block of the transformed host image.

7. The apparatus of claim 6, wherein the generator is further configured to:

divide the host image into a plurality of blocks of a first predetermined size; and divide the watermark image into a plurality of blocks of a second predetermined size.

8. The apparatus of claim 7, wherein the generator is further configured to associate a block of the plurality of blocks of the watermark image to at least one block of the plurality of blocks of the host image.

9. The apparatus of claim 7, wherein the generator is further configured to:

obtain information associated with the watermark image and the host image; and store the information associated with the watermark image and the host image in the matrix code symbol.

10. The apparatus of claim 6, wherein the embedder is further configured to:

store the watermark image in the low frequency coefficients of the host image; and store the matrix code symbol as a binary image in the transformed host image.

* * * * *